March 6, 1951     M. E. BIGELOW     2,543,826

VARIABLE TENSION CIRCULAR JAW ANIMAL TRAP

Filed June 20, 1949

INVENTOR
MERLE E. BIGELOW
BY
ATTORNEY

UNITED STATES PATENT OFFICE 2,543,826

VARIABLE TENSION CIRCULAR JAW ANIMAL TRAP

Merle E. Bigelow, Marysville, Ohio

Application June 20, 1949, Serial No. 100,169

3 Claims. (Cl. 43—90)

My invention relates to animal traps, and more particularly to animal traps of the type embodying a pair of ring-like jaw members which are arranged for relative rotation about a common diametrical axis, and which employs a coiled torsion spring to impart relative rotation to the separate annular jaw members upon the release of a suitable trigger mechanism by an animal coming in contact with such trigger mechanism, whereby the circular jaws of the trap may be closed upon such animal to kill the same.

In the past, traps of this general description have been employed with efficiency in the animal trapping industry, and one particular type of trap embodying this general construction is outlined in detail in my previous United States Patent No. 1,567,900 issued December 29, 1925.

In operating traps of this general character, I have encountered considerable difficulty in initially cocking or setting such traps due to the fact that the tension of the associated torsion spring increases materially as the jaws of the trap are opened or spread apart against spring tension. Further, by reason of the fact that the spring tension, tending to move the separate jaws to their closed positions, progressively decreases as the jaws move from their set or open positions to their closed positions, considerably less force is applied to the jaws of the trap, and consequently to an animal trapped therebetween, when the jaws reach a closed position than is initially applied to the jaws when the latter occupy their open or set position. Oftentimes, particularly after long usage, the spring associated with such traps becomes materially weakened to the extent that many animals may be lost after being initially trapped by reason of the fact that the spring tension applied to the jaws is insufficient to hold the animal between the jaws after initially trapping the same, and even though the animal may be mortally wounded upon the initial springing of the trap, such animals have been known to dislodge themselves from the jaws of the trap and thereafter crawl away to die in a remote location from the trap, thereby causing an unnecessary waste of such animals.

It is, therefore, one of the primary objects of my invention to provide an animal trap of the circular jaw type wherein a pair of annular jaw members are arranged for relative rotational movement under tension of an associated torsion spring which has associated therewith a novel lever arrangement whereby the effective spring tension acting upon the jaws in a direction to close the same reaches its highest magnitude as the jaws approach and reach their closed position rather than when the jaws occupy their open or set position.

It is another object of the present invention to provide a circular jaw trap of the character described which is characterized by its relative ease of operation in initially setting the trap, and which, at the same time, functions efficiently to quickly and tightly trap an animal between the jaws of the trap in a manner which precludes any possibility of the escape of the animal when once lodged between the circular jaw members of the trap.

Still a further object of my invention is to provide a circular jaw trap of this character wherein the spring and lever assembly may be easily disconnected to permit of repair or cleaning of the trap mechanism without resorting to the removal of various fastening devices such as screws, rivets and the like.

For a further and more detailed understanding of the present invention and the various additional objects and advantages derived therefrom, reference is made to the following description and the accompanying drawings, wherein.

Figure 5:
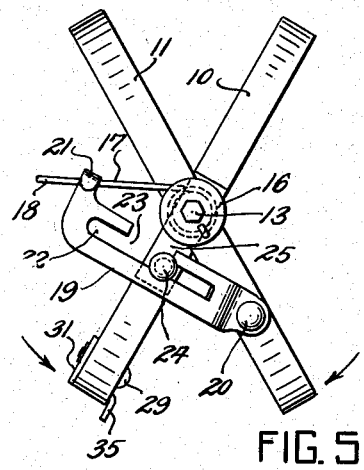
Fig. 5 is a top plan view showing the trap jaws in their intermediate positions moving toward their animal-trapping or closed positions.

With reference to the drawings, it will be seen that the present trap construction makes use of a pair of circular ring-like members which respectively constitute an inner jaw 10 and a separate outer jaw 11. The two jaws are arranged for relative rotational movement through approximately a 180° arc about a common diametrical axis defined by a lower pin 12 which is rigidly secured at its upper end, as by means of welding, to the inner jaw member 10, and which extends radially outwardly through an opening formed in the outer jaw 11 to provide a pivotal connection between the two jaw members, terminating at its outer end in a pointed extremity which may be driven into the ground or a tree or log to support the overall trap structure. Arranged in diametrically opposed order with respect to the pin 12 is a shaft or rod member 13 which is also secured at its inner end to the inner ring or jaw member 10, and which passes through an opening in the outer jaw member 11 to provide for relative rotation between the two jaw members. Preferably, the portion of the shaft 13 which passes through the outer jaw member 11 possesses a circular cross-sectional configuration, whereas the remaining portion of the shaft is formed to provide a multi-angular cross-sectional configuration, such as the hexagonal shape depicted in the drawings. The multi-angular shape of the shaft or rod 13 is provided for a purpose which is to be hereinafter more fully set forth.

Mounted in coaxial relation to the shaft 13 is a coil torsion spring 14 which has one of its end convolutions bent to provide a hooked extremity 15 which is engageable with an opening formed in a circular retaining collar 16 which is carried upon the upper end of the shaft 13. To prevent relative rotation between the circular collar 16 and the shaft 13, the former is provided with a multi-angular opening corresponding closely in size to the outer transverse dimensions of the shaft 13, whereby to preclude relative rotation between the collar and the shaft, and to provide a rigid anchor for the fixed end of the spring 14, and further to provide for versatility of adjustment of the collar upon the shaft with respect to the various positions of the end 15 of the spring. Thus, when it is desired to anchor the end 15 of the spring, the collar may initially be positioned with its spring-receiving opening aligned with the end 15 of the spring commensurate with the turns of the spring. At its opposite end, the spring 14 is formed to provide a laterally extending free end portion 17 which terminates in a circularly bent thumb-receiving region 18.

Figure 4:
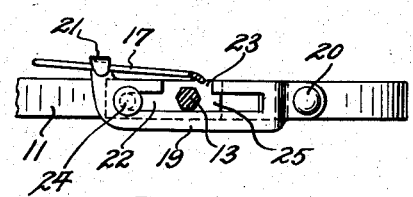
Fig. 4 is a horizontal sectional view taken along the line 4—4 of Fig. 1.

Extending across the upper segment of the outer jaw member 11, to either side of the shaft 13, is a longitudinally slotted bracket-type lever 19 which is pivotally secured at one of its ends to the outer ring or jaw 11, as by means of the pivot pin 20. The opposite end of the bracket lever 19, which extends on the opposite side of the shaft 13 from the pivot point 20, is provided with a hooked extension 21 which receives the laterally projecting free end portion of the spring 14 in a manner to permit of limited longitudinal sliding movement of the end portion 17 within the hooked extension 21, yet, at the same time, to prevent release of the free end portion of the spring in a direction tending to unwind the spring 14. As shown particularly in Figs. 4 and 5 of the drawings, the bracket lever 19 is provided with a longitudinally disposed slot 22 which is open on one side, as at 23, to permit of the introduction of the shaft 13 within the central portion of the slot when the inner and outer jaw members occupy substantially concentric positions.

Slidably occupying the slot 22 within the bracket lever 19 is a headed lug member 24 which is rigidly carried substantially at the outer end of a laterally extending post member 25 which, in turn, is formed at its inner end with a hexagonal opening through which the shaft 13 passes to provide a non-rotative connection between the post 25 and the shaft 13. By nature of the sliding connection between the lug member 24 and the bracket lever 19, the former functions as a sliding fulcrum for the bracket lever upon relative rotational movement of the inner and outer circular jaws 10 and 11.

The inner circular jaw member 10 is provided upon its inner side surface with a boss-forming plate or bracket 26 which is preferably welded to the inner jaw member and which is formed at one end with a socketed boss extension 27 having formed therein a longitudinally extending bore 28. Rotatably carried within the bore 28 is a pivot bolt or pin 29 which has secured at one end, as at 30, an angle iron latch plate 31. The outer end portion of the latch plate 31 is provided with a relatively reduced catch abutment 32 which, upon pivotal swinging movement of the plate 31 about the axis of the pin 29, is movable into the plane of the outer jaw member 11, and when the inner and outer jaw members are moved against tension of the spring 14 to their open or set positions, is movable to a position in abutting engagement with the edge of the outer jaw 11 to prevent the latter from moving relatively to the inner jaw 10, and consequently to prevent accidental springing of the trap. The latch plate 31 at its opposite angularly disposed end has secured thereto, as by means of the rivet 33, an arcuately bent and inwardly extending trigger bar 34 which, when engaged by an animal entering the trap, functions to release the trap, when set, by moving the abutment projection 32 out of engagement with the outer jaw member 11 of the trap. Additionally, the inner jaw member 10 of the trap is provided with a stop abutment 35 which overlaps the outer jaw member 11 on the side opposite to the catch abutment 32 of the trigger mechanism. The member 35 provides a limit stop for the outer jaw member 11 when the latter moves to its closed position and prevents the spring 14 from completely unwinding after springing of the trap.

As aforementioned, the inner and outer jaws 10 and 11 of the trap are pivotally connected on one side by the sharpened pin 12 which may be secured within the ground or a log or tree, and which advantageously may be provided with an anchoring chain 36 to prevent the trap from being carried off by relatively large animals caught between the jaws thereof, it being understood that the free end portion of the chain 36 may be secured or anchored to any relatively immobile object, such as a log or tree.

Figure 1:
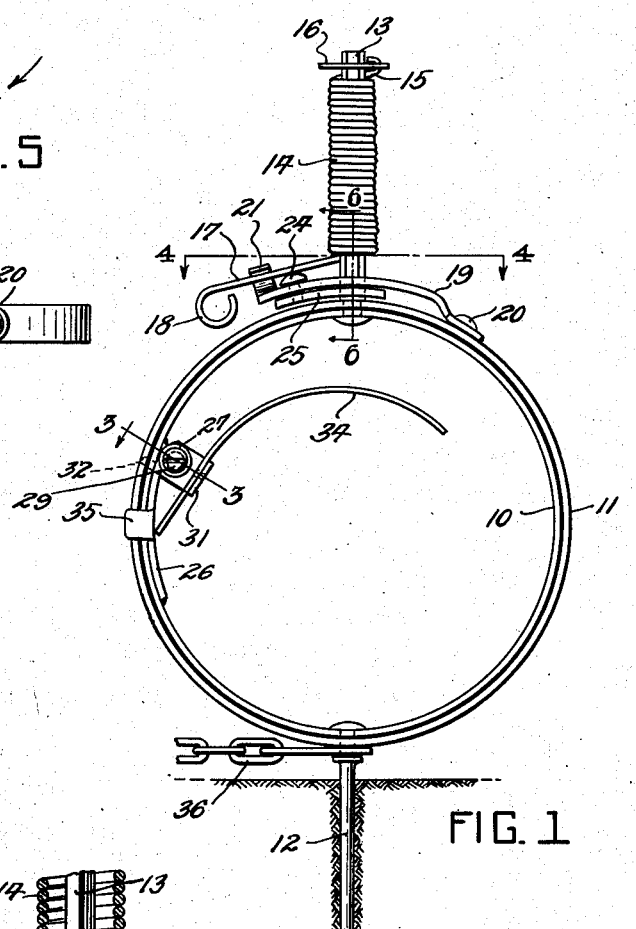
Fig. 1 is a front elevational view of an animal trap formed in accordance with the present invention, and showing the trap in a set or cocked condition.
Figure 3:
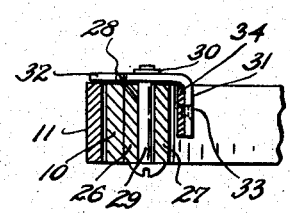
Fig. 3 is a detailed sectional view taken along the line 3—3 of Fig. 1.
Figure 6:
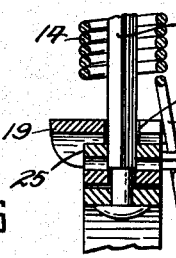
Fig. 6 is a detailed vertical sectional view taken along the line 6—6 of Fig. 1.

In operation, the trap may be positioned in any desired location, preferably in the normal paths or runways of the animals desired to be trapped, and may be baited and suitably camouflaged if desired. In setting the trap, the same is held in a substantially vertical position, as shown in Fig. 1, with the left hand grasping the inner jaw 10 along the right hand side thereof and the right hand grasping the outer jaw 11. The two jaws are then pulled apart from their closed positions while simultaneously applying pressure with the thumb of the right hand to the outer circular end of the spring 14. As the jaws move apart toward their open or set positions, the lug 24 moves within the slot 22 of the bracket lever outwardly toward the spring-receiving extension 21, thus progressively decreasing the moment arm between the outer end of the spring and the fulcrum, while increasing the moment arm between the pivot pin 20 and the fulcrum point of the bracket lever. This, in effect, progressively decreases the amount of force required to move the jaws of the trap from their closed to their opened positions, in spite of the fact that the spring 14 is being placed under increased tension by such movement. When the jaws are completely opened, that is when the same have been rotated relatively through approximately a 180° arc, and lie in substantially concentric planes, the catch abutment 32 of the latch plate is moved in front of the outer jaw 11 to prevent movement thereof to a closed position until released by activation of the trigger bar 34.

Figure 2:
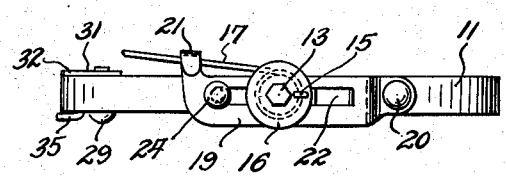
Fig. 2 is a top plan view thereof.

When the trap is set off or released by an animal displacing the trigger bar 34, each of the jaws swings under spring tension through approximately 90° arcs from their positions as shown in Fig. 2 to a closed position where the edge of the outer jaw 11 abuts the stop 35, and in so doing, reach out both in front and in back of the original plane of the jaws, as shown in Fig. 5, to catch and securely hold an animal between the closed jaws. In this manner, an animal which jumps backwardly or forwardly after contacting the trigger bar is usually grabbed by the outwardly swinging outer jaw and thereby prevented from escaping due to its unusual quickness or deftness.

During movement of the jaws of the trap from their open to their closed positions, as illustrated in Fig. 5, the fulcrum lug 24 slides within the slot 22 of the bracket lever 19 from the spring-receiving end thereof to the jaw-engaging end, thereby progressively increasing the moment arm between the spring and the fulcrum, while decreasing the moment arm between the fulcrum and the outer jaw. Thus, as the spring tension decreases upon closure of the trap, the leverage acting upon the outer jaw is conversely increased, in order that a greater work is exerted upon the jaws when the same are closed, rather than when the same are opened. This feature greatly increases the efficiency of the trap in preventing the escape of animals which have once been caught between the jaws, and also minimizes the physical effort necessary to initially set the trap for operation.

While a single preferred form of the present invention has been disclosed in detail, it will be understood that various modifications with regard to constructional details may be resorted to without departing from the spirit of the invention or the scope of the following claims.

I claim:

1. In an animal trap of the type having inner and outer circular jaw members arranged for substantially 180° relative rotation about a common diametrical axis and a shaft member secured to said inner jaw member and extending radially outwardly therefrom and pivotally connecting said outer jaw member to said inner jaw member; a coiled torsion spring arranged coaxially with said shaft member and having one of its ends connected with said shaft member and its opposite end extending freely outwardly to one side of the shaft member; a longitudinally slotted bracket member extending transversely on either side of said shaft member and pivotally connected at one of its ends to said outer jaw member and terminating at its opposite end in a hooked extension for the reception of the outwardly extending free end of said spring; and a lug device carried by said shaft member in laterally offset relation thereto and occupying the slot formed in said bracket, said bracket being adapted to slide on said lug device, said lug device providing a fulcrum for said bracket upon relative rotation of said jaw members whereby to vary the moment arm between the free end of said spring and the pivotal connection between said bracket and said outer jaw member with a variance in the relative rotational positions of said inner and outer jaw members.

2. In combination with an animal trap of the type having a pair of annular jaw members arranged about a common center, pivot means connecting said jaw members for relative rotation about a common diametric axis, a torsion spring connected with said pivot means, and a trigger mechanism operable to releasably hold said jaw members against relative rotation; a slotted lever extending transversely across said pivot means and connected at one end with said spring and at its opposite end with one of said jaw members for urging said one of said jaw members to rotate about said diametric axis; and a fulcrum carried by said pivot means in laterally offset relation thereto and engageable with said lever, said lever being slidable along said fulcrum during relative rotation of said jaw members to vary the moment arms provided by said lever between said spring, said fulcrum and said one of said jaw members.

3. In an animal trap, inner and outer jaw members having common centers, means connecting said jaw members on opposite sides thereof for relative rotation about a common diametric axis, said means comprising a shaft carried by said inner jaw member and having a multi-angular shank portion extending through and radially outwardly from said outer jaw member, a coiled torsion spring carried about the multi-angular shank portion of said shaft, a collar removably but non-rotatively carried on the shank portion of said shaft and having an opening therein to receive and anchor one end of said spring, a lever formed with a longitudinally extending slot and pivotally connected on one side of said diametric axis with said outer jaw and on the opposite side of said axis with the opposite end of said spring, said lever serving to transmit forces exerted by said spring to said outer jaw tending to rotate said outer jaw relative to said inner jaw, and a lug member carried by the multi-angular shank portion of said shaft in laterally offset relation to said diametric axis and extending within the slot formed in said lever for varying the moment arms thereof upon relative rotation of said jaw members.

MERLE E. BIGELOW.

REFERENCES CITED

The following references are of record in the file of this patent:

UNITED STATES PATENTS

| Number | Name | Date |
|---|---|---|
| 411,606 | Parker | Sept. 24, 1889 |
| 1,567,900 | Bigelow | Dec. 29, 1925 |